United States Patent Office 3,326,042
Patented June 20, 1967

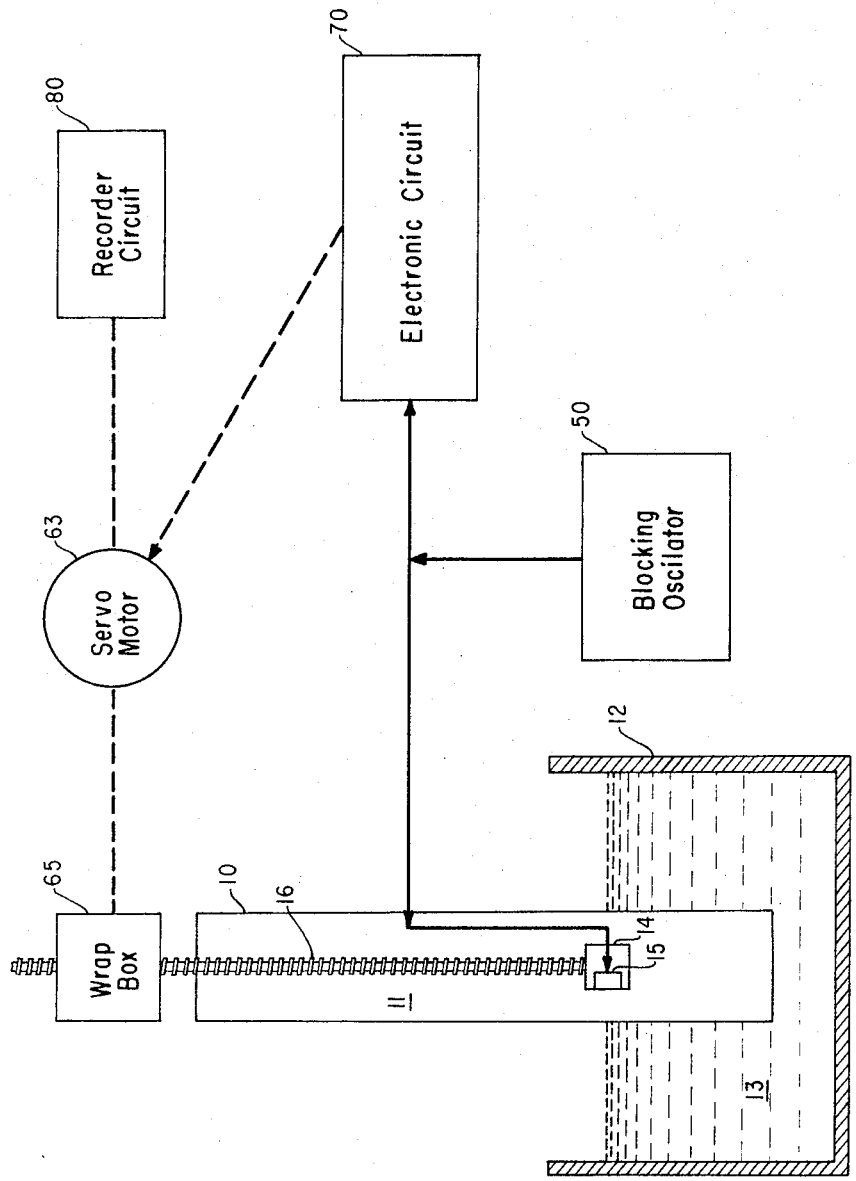

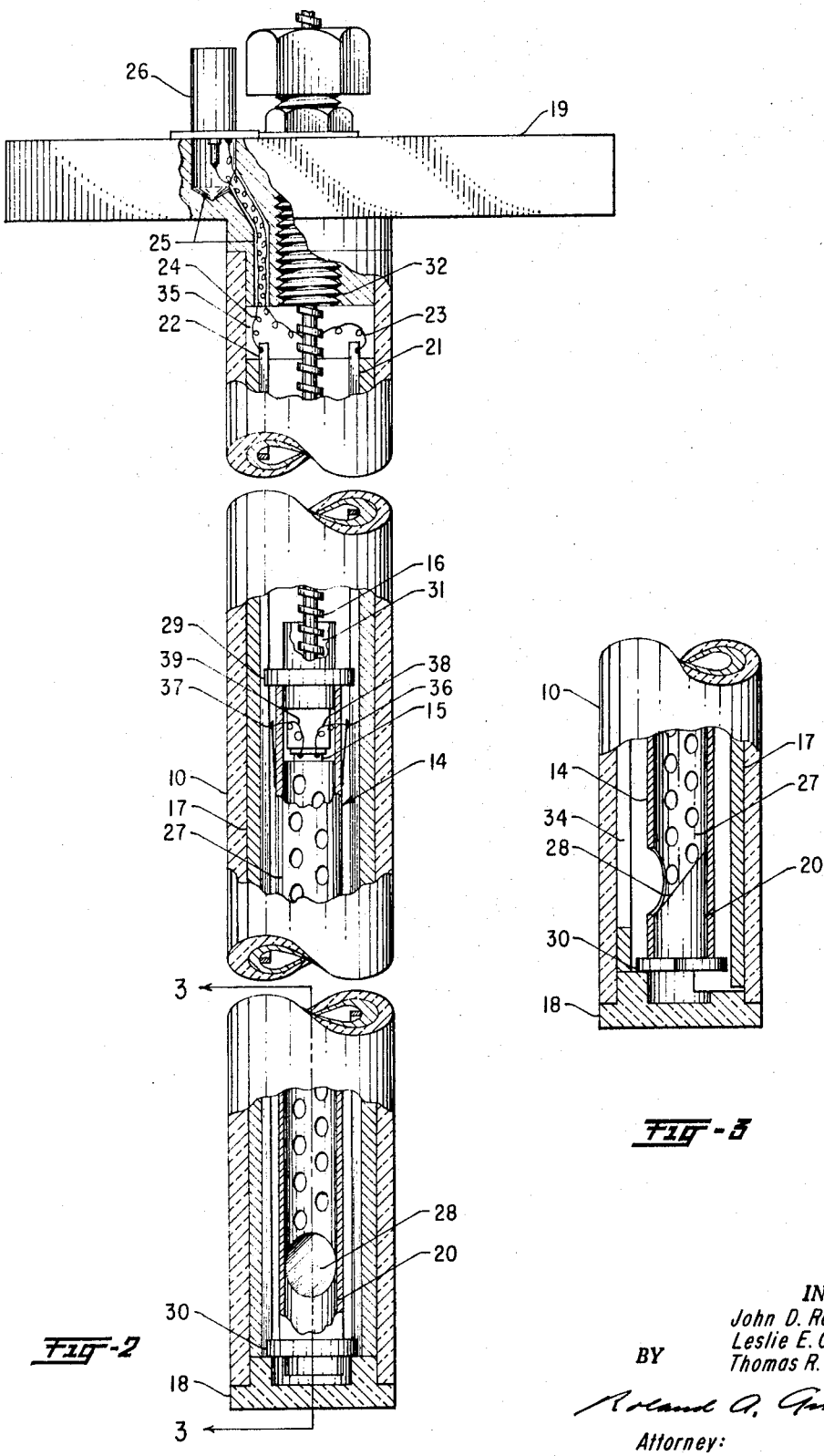

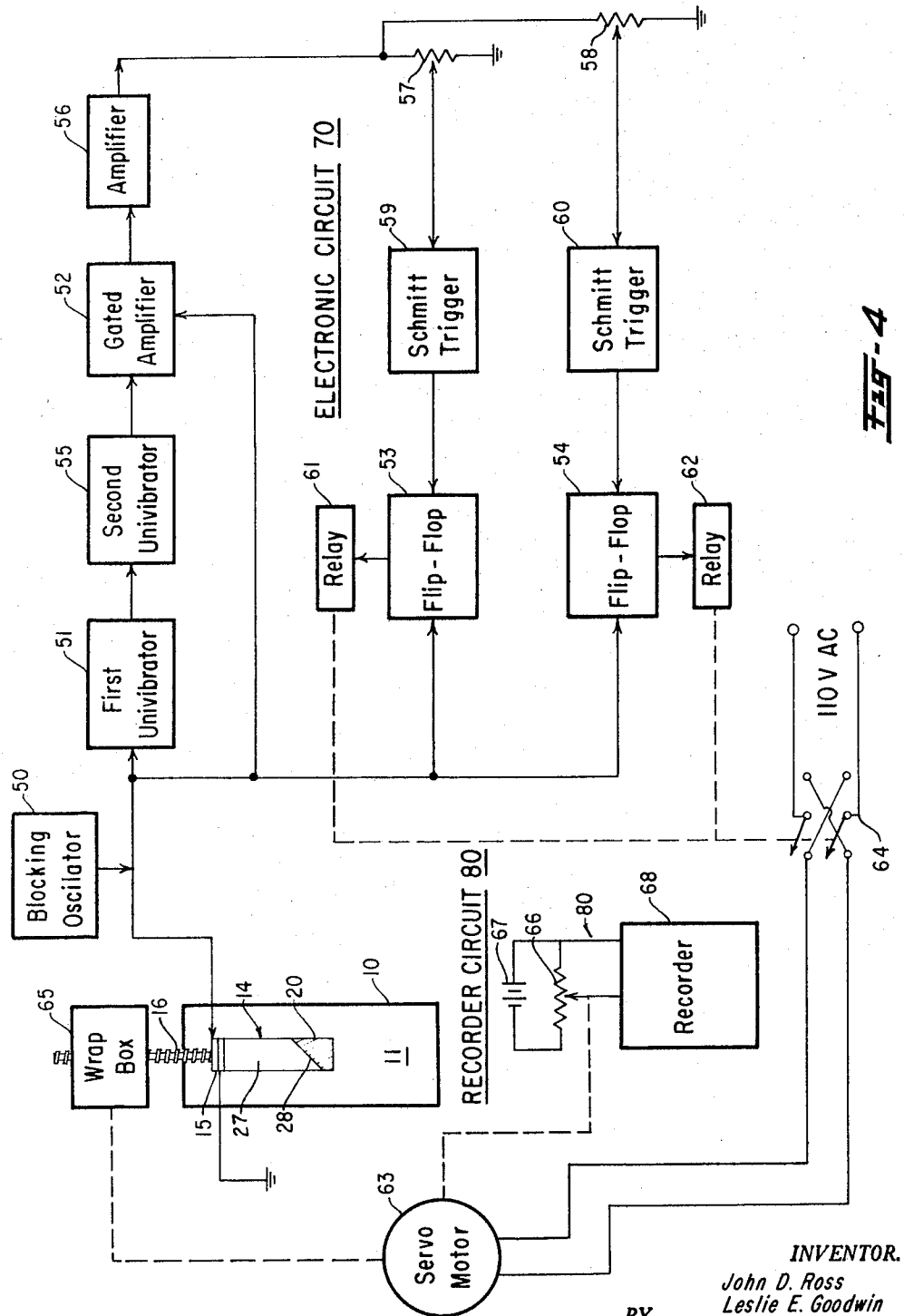

3,326,042
ULTRASONIC LIQUID LEVEL INDICATOR
John D. Ross, Clearwater, Fla., Leslie E. Goodwin, Wilmington, Del., and Thomas R. Herold, Aiken, S.C., assignors to the United States of America as represented by the United States Atomic Energy Commission
Filed Dec. 30, 1964, Ser. No. 422,471
7 Claims. (Cl. 73—290)

ABSTRACT OF THE DISCLOSURE

An ultrasonic reflection apparatus for indicating static and turbulent liquid levels. An ultrasonic transducer and reflector prism, mounted in aligned spaced relationship in a mobile assembly, are positioned vertically in a tubular member by a servo-drive. The tubular member is filled with an acoustical coupling liquid and inserted in a liquid. The transducer detects the liquid-air interface and controls the drive by means of the difference in reflectivity of the surrounding medium. A readout means indicates the liquid level.

---

This invention relates to ultrasonic liquid level determination and more particularly to an ultrasonic reflection method and apparatus for remotely indicating and measuring the level of a liquid in a container.

Heretofore a number of ultrasonic liquid level indicating systems have been proposed which measure liquid level by using a transducer or a plurality of transducers disposed at the bottom of a liquid container within a liquid medium. Ultrasonic pulses are generated and transmitted in the liquid medium toward the top of the body of liquid and reflected at the liquid-gas interface to form a pulse returning to the point of transmission. The elapsed time between the transmission and reception of the ultrasonic pulses of known velocity is a function of the distance traveled by the pulses; thus, the liquid level may be determined with respect to the position of the stationary ultrasonic transducer. For example, see U.S. Patents 2,775,748 and 2,753,542. However, these systems have a number of disadvantages, such as the requirement for elaborate time measuring circuits and maintenance of a fixed liquid temperature and density or means for correcting for variations of temperature and density. Other difficulties arise in the need for remote measurement of liquid levels of solutions that are radioactive or highly corrosive, in the necessity for accurate calibration independent of the acoustic impedance of the liquid, and in corrections for wide liquid level variations. Also, in conventional systems, accurate liquid level readings are difficult to obtain in solutions under turbulent conditions and in solutions having surface frothing conditions.

Accordingly, it is an object of this invention to provide an improved ultrasonic liquid level indicating means which avoids the use of time measuring circuits.

Another object of this invention is to provide an ultrasonic liquid level indicator to give accurate liquid level measurements in solutions of varying density and temperature.

Still another object is to provide an improved ultrasonic liquid level indication system having an inherent fixed calibration means.

It is a further object of this invention to provide accurate means for remotely indicating and measuring the levels of highly corrosive and radioactive liquid media.

It is still another object to provide an improved ultrasonic liquid level indicator means for liquids having turbulent and frothing surface conditions.

These and other objects are accomplished in the present invention by providing ultrasonic means for detecting the difference in ultrasonic reflectivity characteristics of a gas and a liquid. In accordance with the broader aspects of the present invention, a tubular member, filled with an acoustical coupling liquid, is provided extending into a liquid medium whose level is to be determined. A mobile assembly, including an ultrasonic transducer, is disposed for reciprocable movement in the tubular member and within the acoustical coupling liquid. The transducer is adapted to transmit ultrasonic pulses to the wall of the tubular member and to detect ultrasonic pulses reflected from the wall to the transducers. Electronic means are provided for energizing the transducer and detecting the reflected pulses received at the transducer. Control means, responsive to the reflected pulses, control the reciprocating movement of the mobile assembly and indicate the relative position of the mobile assembly and transducer with respect to the tubular member. In using this embodiment of the ultrasonic liquid level indicator, short ultrasonic pulses transmitted by the transducer are directed approximately parallel to the plane of the liquid surface toward the wall of the tubular member extending into the liquid medium. If the ultrasonic pulses directed toward the wall of the tubular member are above the liquid level, the poor acoustic impedance match at the tubular member-gas interface results in most of the ultrasonic pulses being reflected. When the ultrasonic pulses directed toward the wall of the tubular member are below the liquid level a good acoustic impedance match results in most of the ultrasonic pulses being transmitted into the liquid rather than reflected. The magnitude of the reflected pulse is measured by electronic means to determine the direction of movement of the mobile assembly relative to the tubular member and the liquid level. Control means are adapted to move the mobile assembly up or down until the ultrasonic pulses are directed at the liquid-gas interface. An indicator means comprising a potentiometer responsive to the control means and a calibrated recorder indicate the position of the liquid-gas interface (viz., the liquid level) relative to the tubular member.

In accordance with another aspect of the present invention, the mobile assembly comprises an ultrasonic transducer and an ultrasonic reflector mounted in aligned spaced relationship and disposed for unitary reciprocable movement within the tubular member and the acoustical coupling liquid. In using the second embodiment, ultrasonic pulses, transmitted by the transducer, are directed by the ultrasonic reflector approximately parallel to the plane of the liquid surface toward the wall of the tubular member extending into the liquid medium. In this embodiment, using the same electronic and control circuitry, the mobile assembly is moved up or down, depending upon the magnitude of the reflected pulses, until the ultrasonic reflector comes to rest opposite the liquid-gas interface. The recorder is calibrated to indicate the position of the liquid-gas interface (viz., the liquid level) relative to the tubular member.

Other objects, advantages and features of the invention will become apparent upon a consideration of the following detailed description and the accompanying drawings in which:

FIG. 1 is a block diagram illustrating one embodiment of the present invention;

FIG. 2 is an elevation view, certain parts being cut away and shown in section for clarity, illustrating a preferred embodiment of the mobile assembly within the tubular member;

FIG. 3 is a sectional view taken along line 3—3 of FIG. 2;

FIG. 4 is a block diagram illustrating a preferred embodiment of the present invention including details of the electronic and recorder circuits of FIG. 1.

The invention will now be described with particular reference to FIG. 1 wherein tubular member 10, filled with an acoustical coupling liquid 11, is disposed in a container 12 including a liquid medium 13 whose level is to be determined. A mobile assembly 14, including an ultrasonic transducer 15, is disposed within tubular member 10 for reciprocable movement throughout the length of tubular member 10. Positive reciprocable movement of the mobile assembly 14 within the tubular member 10 is provided by a positive displacement flexible cable 16 attached to the upper end of the mobile assembly 14. Flexible cable 16 extends axially upward in the tubular member 10 to engage a servo drive and control box, well known in the art as a "wrap box" 65, mounted on the upper end of tubular member 10. The transducer 15, which in this embodiment is mounted so that ultrasonic pulses emitted therefrom are directed toward the walls of tubular member 10, and approximately parallel to the surface of liquid medium 13, is energized by driving pulses from blocking oscillator 50. The driving pulses from blocking oscillator 50 are also applied to the electronic circuit 70 which is connected to receive the output of ultrasonic transducer 15. Electronic circuit 70, which will be hereinafter described in greater detail, includes gating, switching and relay circuits responsive to reflected pulse excitation of the transducer 15. The electronic circuit 70 is then connected to the input of a servo motor 63 geared to wrap box 65 which drives the flexible cable 16. Servo motor 63 also has an output connected to a recorder circuit 80 which is calibrated to indicate the relative position of the mobile assembly 14 and the transducer 15 with respect to the tubular member 10, whereby an indication of the level of the liquid medium 13 is provided. Further details and the operation of the mobile assembly within the tubular member and the electronic, control and recorder circuits will be described in connection with a preferred embodiment shown in FIGS. 2, 3 and 4.

Referring now in particular to the preferred embodiment shown in FIGS. 2 and 3, the mobile assembly 14 is slidably disposed within tubular member 10 which serves as a vessel for an acoustical coupling liquid and as means for isolation of the mobile assembly 14 from the liquid medium whose level is to be measured. The tubular member 10, which has suitable acoustic impedance characteristics, is laterally supported by a rigid tube 17 immovably fitted into the tubular member 10 to extend substantially the full length thereof. The lower end of tubular member 10, which extends into the liquid medium, is sealed with an impervious end plug 18 and the upper end is sealably connected to flange support member 19 to provide both a means for attachment to a liquid container and a closure of the upper end of tubular member 10. The rigid tube 17 is slotted longitudinally at 34 (see FIG. 3) for at least the length of travel of an ultrasonic reflector 20 in the mobile assembly 14, hereinafter described, and is provided with two circumferentially spaced electrically conductive guide strips 21, 22 which extend the length of tube 17, each disposed in equal spaced relationship to the central axis of the longitudinal slot 34 (see FIG. 3) in tube 17. Suitable electrical insulation (not shown) is provided between the tube 17 and the guide strips 21, 22. The upper ends of guide strips 21, 22 are attached to electrical leads 23, 24, respectively, which extend through a space 35, between the upper end of tube 17 and support member 19, and an opening 25 in member 19. Leads 23, 24 are connected to a standard bayonet electrical connector 26. Electrical connector 26 is connected by a suitable conductor to the electronic circuitry shown in FIGURE 4.

The selection of material for the tubular member 10, end plug 18 and flange support member 19 is not critical and any impervious material may be used which does not react with the acoustical coupling liquid and the liquid medium whose level is to be determined. Suitable materials include metals and plastics which provide good acoustic impedance match with the liquids and minimum attenuation of ultrasonic energy. Unless thermally hot liquids are being measured, a plastic material, such as polyvinylchloride (PVC) is preferred. The rigid tube 17 and the electrically conductive guide strips 21, 22 may be fabricated from any suitable metal such as brass, copper, or aluminum.

Slidably disposed between guide strips 21, 22 within tube 17 is a mobile assembly 14 which comprises a perforated tubular element 27 having near its upper end an internally mounted ultrasonic transducer 15 and near its lower end in aligned spaced relationship to the transducer, an internally mounted ultrasonic reflector 20. Both the transducer 15 and the ultrasonic reflector 20 are aligned in tubular element 27 so that the path of ultrasonic pulses transmitted from the transducer 15 will travel down tubular member 27 to the reflecting surface 28 of reflector 20 and be reflected at an angle of approximately 90 degrees from the original transmission path or approximately parallel to the liquid surface. Perforated tubular element 27, which may be made of any suitable rigid, non-corrosive material, such as stainless steel, is perforated throughout to permit the unimpeded entry of acoustical coupling liquid and includes an opening opposite the reflecting surface 28 of reflector 20 to allow the unattenuated passage of ultrasonic pulses to the wall of tubular member 10. Reflector 20 may be any suitable ultrasonic reflector and in this preferred embodiment is a stainless steel cylinder cut at an angle of 45°. Attached at each end of perforated tubular element 27 are slotted guide rings 29, 30 which slidably engage guide strips 21, 22 in said slots to maintain the 45° reflecting surface 28 of reflector 20 suitably aligned with the longitudinal slot 34 (FIG. 3) in tube 17. To provide positive reciprocable movement of mobile assembly 14 within the rigid tube 17, a positive displacement flexible cable 16 is attached at the upper end 31 of tubular element 27. Flexible cable 16, which may be any suitable positve displacement cable (such as "Teleflex" cable manufactured by Teleflex Incorporated, North Wales, Pa.,), extends axially upward in tube 17 through an axial hole in cable guide 32 threadably inserted through member 19 and coaxial with tube 17, to engage a servo drive and control box well known in the art as a "wrap box" (FIGS. 1 and 4) mounted on the upper surface of member 19. Adjacent ultrasonic transducer 15 on the exterior surface of perforated tubular element 27 are mounted two sliding electrical contacts 36, 37. These contacts 36, 37 are equally spaced on the circumference of tubular element 27 in the same vertical plane as guide strips 21, 22 and are in contact therewith throughout the length of strips 21, 22. A second pair of electrical leads 38, 39 connect transducer 15 with the sliding contacts 36, 37.

Acoustical coupling between the ultrasonic transducer 15, reflector 20 and the wall of tubular member 10 is provided by filling the tubular member 10 including the perforated tubular element 27 with a liquid having desirable acoustical coupling characteristics. While the selection of an acoustical coupling liquid is not critical, an oil, such as silicone oil is preferred.

Referring now to FIGURE 4, the various components of the electronic, control and recorder circuit for the preferred embodiment of FIGS. 2 and 3 are shown in block diagram since the components are well known to those skilled in the art. Ultrasonic transducer 15 within the tubular element 27 is coupled via electrical connector 26 (FIG. 2) and a suitable electrical conductor to a blocking oscillator 50 and other associated electronic, control and recorder components shown in FIGURE 4.

The transducer 15, which may be any suitable piezoelectric type is energized by a blocking oscillator 50. While the type and frequency of the transducer is not critical, a lead-zirconium-titanate transducer having any excitation frequency from about 0.75 mc./sec. to 5 mc./sec. is suitable for the type of circuitry herein described; however, a 1 mc./sec. transducer is preferred. In this preferred embodiment, the blocking oscillator 50 is capable of pulsing the transducer 15 at the rate of 600 times per second to generate a 1-megacycle "ringing" burst of ultrasonic energy of about 50 microseconds' duration per pulse. Thus, 600 bursts of ultrasonic energy per second are transmitted down tubular element 27 to ultrasonic reflector 20 where they are directed by reflecting surface 28 to the wall of tubular member 10. Reflected pulses from the wall of tubular member 10 are returned to the transducer 15 by ultrasonic reflector 20. In this embodiment the reflected pulses follow the driving pulses by about 200 microseconds, which is the total transit time for the pulses to travel from the transducer 15 to the wall of the tubular member 10 and back to the transducer 15. To achieve this preferred transit time with a transducer having a frequency of 1 mc./sec. the distance from the transducer 15 to the center of the reflecting surface 28 of reflector 20 should be about 5 inches and distance from the center of the reflecting surface 28 to the wall of tubular member 10 in contact with a liquid medium should be about ½ inch.

In addition to energizing transducer 15, the driving pulse output of blocking oscillator 50 is also applied in the electronic circuit 70 to the input of the first univibrator 51, the input of gated amplifier 52, and the inputs of first and second flip-flops 53, 54, respectively. When first univibrator 51 is triggered by the driving pulse from blocking oscillator 50, the negative portion of its voltage output is differentiated and applied to second univibrator 55. First and second univibrators 51 and 55 are of any type well known in the art. The voltage output of second univibrator 55, which follows the driving pulse by about 170 microseconds, is applied to gated amplifier 52. Gated amplifier 52 serves to eliminate the driving pulses from the circuit and passes as output only the reflected pulses to the reflected pulse amplifier 56. While a conventional type gated amplifier may be used, it has been found that a gated amplifier such as the type used in color television synchronous detectors provides the best gating characteristics. This preferred gated amplifier uses two dual-plate, sheet beam tubes each of which has a pair of balanced deflectors to direct the tube current to either of the two plates. The relative magnitudes of the unbalanced voltages applied to the deflectors determine the plate to which the current is switched. A control grid varies the intensity of the current. Each tube may be considered as being equivalent to a voltage-controlled, single-pole, double-throw switch. The tubes used in the gated amplifier 52, of this preferred embodiment, are two types 6AR8 tubes. Thus, the gated amplifier 52 passes no output from the driving pulse; however, the driving pulse itself generates a delayed voltage pulse via first and second univibrators 51 and 55 which gate the tubes in the gated amplifier 52 in time to amplify and pass the reflected pulse on to the reflected pulse amplifier 56. Reflected pulses, amplified in the reflected pulse amplifier 56, are fed through trigger level potentiometers 57 and 58 to the input of first and second Schmitt trigger circuits 59 and 60. Schmitt triggers 59, 60 are each biased by trigger level potentiometers 57, 58 to trigger at slightly different voltage levels. The output of the first Schmitt trigger 59 drives first flip-flop 53 and the output of the second Schmitt trigger 60 drives the second flip-flop 54. As noted above the flip-flops 53, 54 are initially set by the driving pulse of blocking oscillator 50. Flip-flops 53 and 54 each have outputs connected to first and second relay 61 and 62, respectively, which are in turn connected to motor control switch 64 of the control portion of the circuit. A suitable servo motor 63, geared to the wrap box 65, is controlled by the motor control switch 64. As previonsly described, the wrap box 65 drives the flexible cable 16 which positions the reciprocable mobile assembly 14 within support tube 17 and tubular member 10. The servo motor 63 is also connected through a potentiometer 66 to supply an output voltage from a DC source 67 to a calibrated recorder 68, whereby an indication of the relative position of the mobile assembly 14 including the reflector 20 with respect to the tubular member 10 and the liquid level is provided. In this preferred embodiment the potentiometer 66 is a 10-turn oil-filled potentiometer of the "Helipot" type which supplies a 0–50 millivolt output voltage to the recorder 68.

The operation of the liquid level indicator of the present invention will be apparent from the foregoing description. Tubular member 10, including the mobile assembly 14, is inserted into a liquid container and attached thereto by means of flanged member 19. Connection between the ultrasonic transducer 15 and the blocking oscillator 50 is provided by lead wires 38, 39, sliding contacts 36, 37, guide strips 21, 22, lead wires 23, 24, electrical connector 26 and external lead wires. Blocking oscillator 50 continuously sends pulses of ultrasonic energy to the transducer 15 which in turn transmits "ringing" bursts of energy of about 50 microseconds duration for each pulse through the acoustical coupling liquid. Pulses are directed to the wall of tubular member 10 by reflector 20 and reflected pulses from the wall of tubular member 10 are returned via reflector 20 to the ultrasonic transducer 15. The magnitude of the reflected pulse is large when the ultrasonic reflector 20 is above the liquid surface and is small when it is below the liquid surface. The reflected pulses are separated from the driving pulses in gated amplifier 52 and amplified in the reflected pulse amplifier 56. Since Schmitt triggers 59 and 60 are biased to trigger at slightly different levels the circuitry is designed so that when the amplified reflected pulse is large enough to fire both Schmitt triggers, relays 61 and 62 are de-energized and the servo motor 63 drives the mobile assembly 14 and reflector 20 downward toward the liquid surface. When the amplified reflected pulse is too small to fire either Schmitt trigger 59 or 60, relays 61 and 62 are energized and the servo motor 63 drives the mobile assembly 14 and reflector 20 upward toward the liquid surface. When the amplified reflected pulse is large enough to fire second Schmitt trigger 60 but is too small to fire first Schmitt trigger 59, first relay 61 becomes energized and second relay 62 stays de-energized and the motor 63 is stopped. In this case the two windings of the servo motor 63 are connected in parallel across the 110 volt A.C. circuit, through the motor control switch 64, which applies dynamic braking to the motor and stops it immediately. The circuit is calibrated so that this condition developes when the reflector 20 is aligned with the liquid surface whose level is to be determined. As previously described motor 63 also controls a potentiometer 66 to supply a voltage to a calibrated recorder 68 which gives a remote indication of liquid level.

Depending on the difference between the individual bias levels of Schmitt triggers 59 and 60, the drive will lock when the reflector 20 is in any position from barely emerging from the liquid to almost all the way out of the liquid. For the case in which a liquid of constant constituency is being monitored, the effect of a gain change on overall system operation would be minimized by locking the drive with the reflector 20 in the barely emergent position. On the other hand, if the system gain remains constant and the liquid contituency varies appreciably, the system would operate more accurately by locking the drive with the reflector 20 almost all the way out of the liquid. A good compromise and one used in the present embodiment is to lock the drive when the reflector 20 is centered at the liquid-gas interface.

It should be noted that a fixed spacing is used between the ultrasonic transducer 15 and the reflector 20 so that there is a constant transit time for the ultrasonic pulses. This results in an inherent fixed calibration to provide exceptional accuracy and a simplified ultrasonic circuitry.

Utilizing the ultrasonic reflection method and apparatus described herein, liquid levels of static solutions of $H_2O$, 3 M $HNO_3$, 20% tributylphosphate (TBP)–70%

"Ultrasene" (a kerosene product available from the Atlantic Refining Company, Philadelphia, Pa.), 10 g./l. uranium in 3 M $HNO_3$, and 10 g./l. uranium in 30% TBP–70% "Ultrasene" were measured over a range of 0–46 cm. with reproducible accuracy of ±0.025 cm. Comparable accuracy was also obtained when measuring the level of turbulent and frothing solutions. This accuracy is also unaffected by changes in density, temperature and liquid level of the solutions being measured.

It is not intended that this invention be limited to the specific embodiments described and illustrated in the foregoing specification but only by the scope of the appended claims.

What is claimed is:
1. Apparatus for determining liquid level comprising:
   (a) a tubular member extending into a liquid medium, said tubular member being filled with an acoustical coupling liquid;
   (b) an ultrasonic transducer disposed for reciprocable movement within said tubular member, said ultrasonic transducer being adapted
      (1) to transmit ultrasonic pulses to the wall of said tubular member and
      (2) to detect ultrasonic pulses reflected from said wall of said tubular member;
   (c) means for energizing said transducer;
   (d) means for controlling the movement of said transducer in response to said reflected pulses; and
   (e) means for indicating the position of said transducer relative to said tubular member.
2. Apparatus for indicating liquid level comprising:
   (a) a tubular member extending into a liquid medium, said tubular member being filled with an acoustical coupling liquid;
   (b) an ultrasonic transducer and an ultrasonic reflector disposed in spaced relationship for unitary reciprocable movement within said tubular member, said ultrasonic reflector being adapted
      (1) to direct ultrasonic pulses received from said transducer to the wall of said tubular member and
      (2) to direct ultrasonic pulses reflected from said wall to the transducer;
   (c) means for energizing the transducer;
   (d) means for controlling the movement of said transducer and reflector in response to said reflected pulses; and
   (e) means for indicating the relative position of the transducer and reflector with respect to the tubular member.
3. The apparatus of claim 2 wherein said ultrasonic reflector has a 45° reflecting surface.
4. The apparatus of claim 2 wherein said transducer has an excitation frequency of between about 0.75 mc./sec. and 5 mc./sec.
5. Apparatus for indicating liquid level comprising:
   (a) An oil-filled tubular member extending into a liquid medium;
   (b) a mobile assembly, including an ultrasonic transducer and an ultrasonic reflector in spaced relationship, disposed for unitary vertical reciprocable movement within said tubular member, said reflector being adapted
      (1) to direct ultrasonic pulses received from said transducer to the wall of said tubular member and
      (2) to direct ultrasonic pulses reflected from said wall to the transducer;
   (c) means for energizing said transducer;
   (d) means for controlling the vertical movement of said mobile assembly in response to said reflected pulses; and
   (e) means for indicating the relative position of the mobile assembly with respect to the tubular member.
6. Apparatus for indicating liquid level comprising:
   (a) an oil-filled impervious tubular member at least the lower portion of which is immersible in a liquid medium to provide an oil column extending above and below the level of the liquid;
   (b) a tubular element vertically reciprocable within said oil column having an ultrasonic transducer at its upper end and an ultrasonic reflector at its lower end, said reflector being aligned with the transducer
      (1) to direct ultrasonic pulses received from the transducer to the wall of the tubular member and
      (2) to direct ultrasonic reflected pulses back from said wall to the transducer;
   (c) means for energizing said transducer to transmit ultrasonic pulses;
   (d) means including the transducer for detecting said reflected ultrasonic pulses;
   (e) means for moving the tubular element in response to the magnitude of the reflected pulses to maintain the ultrasonic reflector at a substantially constant position relative to the liquid level; and
   (f) means for indicating the position of said reflector relative to said tubular member.
7. Apparatus for indicating liquid level comprising:
   (a) an oil-filled impervious tubular member at least the lower portion of which is immersible in a liquid medium to provide an oil column extending above and below the level of the liquid;
   (b) a tubular element vertically reciprocable within said oil column having an ultrasonic transducer at its upper end and an ultrasonic reflector at its lower end, said reflector being aligned with said transducer
      (1) to direct ultrasonic pulses received from said transducer horizontally toward the wall of the tubular member and
      (2) to direct ultrasonic reflected pulses back from said wall to the transducer;
   (c) oscillator means for energizing said transducer to transmit ultrasonic pulses;
   (d) means including the transducer for detecting and amplifying said reflected ultrasonic pulses;
   (e) means for reciprocating the tubular element in response to the relative magnitude of the reflected pulses to maintain the reflector at a substantially constant position relative to the liquid level;
   (f) indicator means for indicating the position of said reflector relative to the liquid level.

References Cited
UNITED STATES PATENTS
2,683,371   7/1954   Droin et al. _____73—290
FOREIGN PATENTS
222,586   7/1959   Australia.

LOUIS R. PRINCE, *Primary Examiner.*
S. C. SWISHER, *Assistant Examiner.*